United States Patent [19]

Azzani

[11] 4,117,439
[45] Sep. 26, 1978

[54] TRANSDUCER FOR MEASURING LINEAR POSITIONS

[75] Inventor: Nino Azzani, Ivrea (Turin), Italy

[73] Assignee: Ing. C. Olivetti & C., S.p.A., Ivrea (Turin), Italy

[21] Appl. No.: 784,429

[22] Filed: Apr. 4, 1977

[30] Foreign Application Priority Data

Apr. 8, 1976 [IT] Italy ................. 67821 A/76

[51] Int. Cl.² .......................................... H01F 21/04
[52] U.S. Cl. ................................................ 336/129
[58] Field of Search ............... 336/20, 30, 115, 129

[56] References Cited

U.S. PATENT DOCUMENTS

| 3,522,568 | 8/1970 | Hasbrouck | 336/20 |
| 3,596,222 | 7/1971 | Pagella | 336/129 |

Primary Examiner—Thomas J. Kozma
Attorney, Agent, or Firm—Schuyler, Birch, Swindler, McKie & Beckett

[57] ABSTRACT

A transducer for measuring linear positions comprises a scale formed of a tensioned flexible band and a slide movable with respect to the scale. A rigid guide plate fast with the slide extends over the whole area of the slide winding and cooperates with a resilient plate having guide lugs at each end of the guide plate and so bent as to have lips bearing against two edges of the band. A leaf spring element on the resilient plate urges the lips against the side of the band opposite to the plate.

5 Claims, 5 Drawing Figures

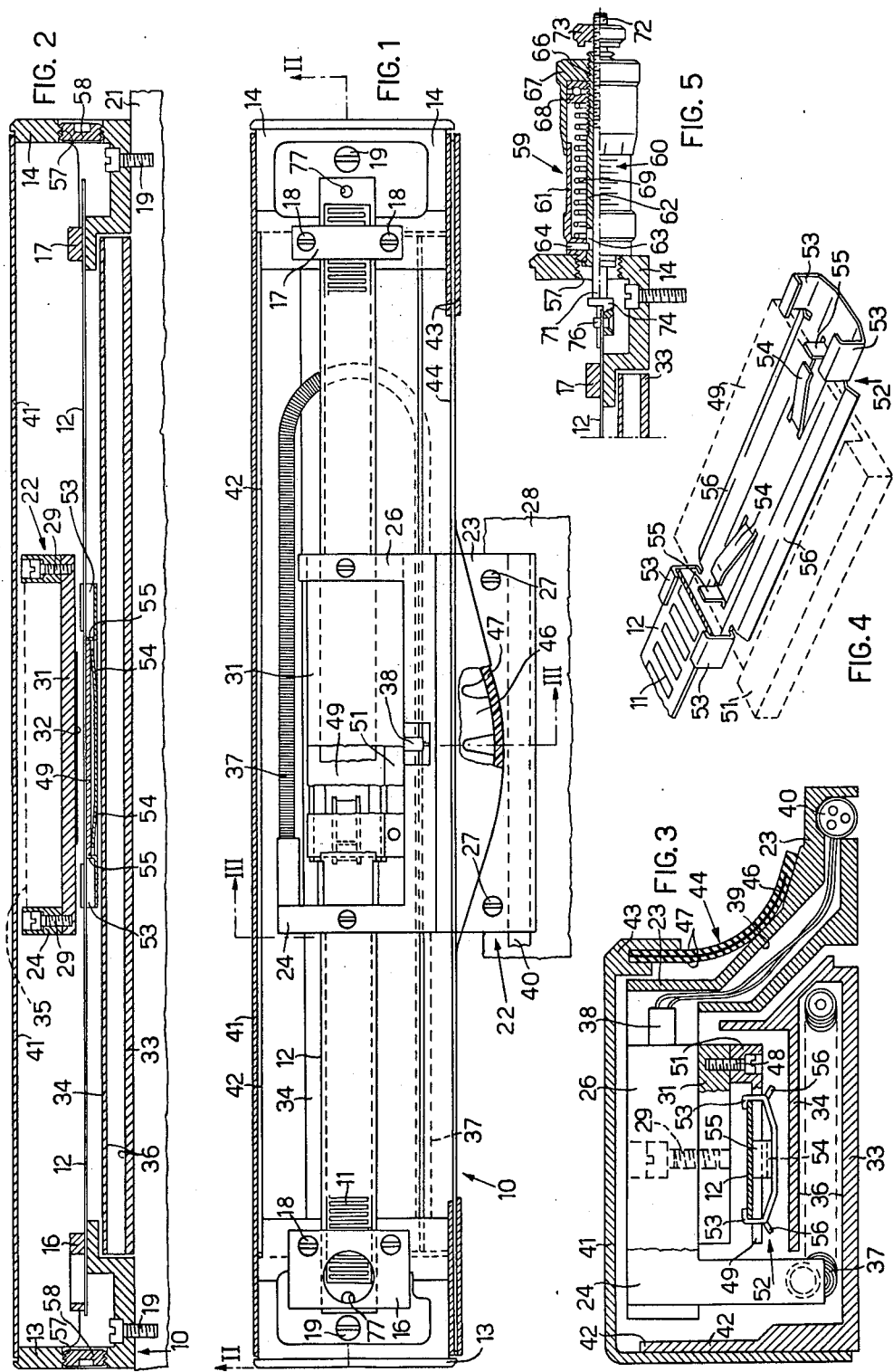

TRANSDUCER FOR MEASURING LINEAR POSITIONS

BACKGROUND OF THE INVENTION

The present invention relates to a precision transducer for measuring linear positions, comprising a scale bearing a first electric winding and a slide movable with respect to the scale and bearing a second winding, the scale being constituted by a tensioned flexible band and the slide having guide means for the band. It is well known that, when one winding is energised to induce a signal in the other winding, the phase of the induced signal changes cyclically as the slide is moved and each $2\pi$ change of phase corresponds to a known increment of displacement. By keeping track of the increments (counting them algebraically) the position of the slide can be determined. It is known also to measure fractions of an increment and some arrangements may employ more than one winding on the scale or slide.

In a known transducer of the aforesaid type, the scale band is guided through the slide by means of two pairs of V-shaped guides, one pair at each end of the slide. During the movement of the slide, the scale band can undergo deformation between the two pairs of guides, bringing one of its edges closer to, or moving it away from, the slide, so that the scale is not kept perfectly parallel to the slide and the signals induced in the winding of the slide can be distorted and give rise to errors of measurement.

SUMMARY OF THE INVENTION

The object of the invention is to provide a transducer in which the scale, in the form of a band, is kept perfectly parallel in relation to the slide and at a predetermined distance therefrom.

According to the present invention, there is provided a transducer for measuring linear positions, comprising a scale constituted by a tensioned flexible band bearing a first electric winding, a slide movable with respect to the scale and bearing a second winding, a guide plate fast with the slide, parallel to the second winding and extending over the whole area of the second winding, and pressure means arranged to keep the band in close contact with the plate.

BRIEF DESCRIPTION OF THE DRAWINGS

The invention will be described in more detail, by way of example, with reference to the accompanying drawings, in which:

FIG. 1 is a plan view, partly in section, of a precision transducer embodying the invention for measuring linear positions;

FIG. 2 is a partial section on the line II—II of FIG. 1;

FIG. 3 is a section on a larger scale on the line III—III of FIG. 1;

FIG. 4 is a perspective view of a detail of the transducer; and

FIG. 5 is a view, partly in section, of a spring device for the tension of the band of the transducer scale.

DESCRIPTION OF THE PREFERRED EMBODIMENT

Referring to FIG. 1, a scale 10 comprises an electric winding 11 which is printed by a photogravure technique in the form of a zig-zagging conductive strip on an insulating layer on a flexible band 12 of spring steel.

The band 12 is tensioned in the manner which will be seen hereinafter and is fixed at its two ends to two connection blocks 13 and 14 by means of two plates 16 and 17, each of which is clamped against the corresponding block 13, 14 by means of two screws 18. The blocks 13 and 14 are previously fixed by means of screws 19 to the machine part relative to which it is desired to measure positions, for example, a table 21 of a machine tool or of a dimension detector.

The transducer, moreover, comprises a slide 22, which includes a sidepiece 23 integral with two arms 24 and 26 which extend transversely over the scale at positions spaced lengthwise along the scale. The sidepiece 23 is fixed by means of two screws 27 to the machine part which is shifted with respect to the table 21, for example to the support 28 of a tool spindle of the machine tool or of a feeler of the dimension detector.

Fixed to the two arms 24 and 26 (FIG. 2) of the slide 22 by means of adjustable screws 29 is a rectangular plate 31, to the bottom surface of which there is applied a second electric winding 32 which is also printed by the photogravure technique. For precision of the measurements made by the transducer, the electric winding 32 must be located exactly parallel to the winding 11 and at a predetermined distance therefrom. Moreover, the slide 22 must move with respect to the scale in such a manner as to keep this parallelism and this distance unchanged.

The transducer is closed at the bottom by a base 33 of light alloy connected to the two blocks 13 and 14 or fixed to the table 21 in any known manner. The base 33 bears a plate 34 (FIG. 3) integral therewith which separates a space 36 in which there is housed a flexible sheath 37 (FIG. 1). This sheath is connected at one end to the block 13 of the scale 10 and at the other end to the arm 24 of the slide 22. Into the sheath pass the electric cables of the transducer 10 which connect the left-hand end of the winding 11 to the amplifier 35 disposed on the slide 22. The amplifier 35 is connected to a current tap 38 (FIG. 1) connected through an opening 39 (FIG. 3) in the sidepiece 23 to the supply cables 40 for the scale 10 and the amplifier 35 (FIG. 2).

The transducer 10, moreover, comprises a cover 41 (FIG. 3), also of light alloy, which is fixed to an upwardly extending rear portion 42 of the base 33. At the front, the cover 41 has an overhanging angular portion 43 to which there is fixed a strip 44 of resilient material. This extends over the sidepiece 23 of the slide 22 and serves to protect the winding 11 of the scale 10 and the winding 32 of the slide 22 from dust or other external agents.

The strip 44 is composed of a metal core 46 covered on both its faces by a yielding material, for example by means of a rubber sheath 47 of U-shaped cross-section. The sheath 47 may also take a C-shaped form so as to render the insertion of the core 46 into the sheath easier. Moreover, the core 46 may constitute an insert to be embedded in the strip 44 at the time of the vulcanization of the rubber composition which will form the sheath 47, whereby the structure of the strip 44 acquires a greater integration.

The core 46, in turn, is cut in the form of a comb at the lower edge (FIG. 1) to assist the bending of the strip 44 to the outside on the passage of the slide 22, without leaving a wide space between the edges of the slide 22 and the front edge of the base 33.

For the purpose of guiding the flexible band 12 in the proximity of the slide 22, a second plate 49 (FIG. 3) is fixed to the plate 31 by means of screws 48. A step 51 on the plate 49 abuts the front part of the plate 31 and keeps the plate 49 spaced from the plate 31. The flexible band 12 extends between the two plates 31 and 49 in contact with the plate 49, so that in the region of the slide 22, the band 12 is guided along the entire length which is active at that moment.

The slide 22, moreover, comprises pressure means for keeping the band 12 in close contact with the plate 49 and, therefore, at a strictly constant distance from the winding 32. These pressure means are constituted by a resilient or spring plate 52, which is suitably notched and bent and moves rigid with the plate 49. More particularly, the plate 52 (FIG. 4) fits under the plate 49 and is provided at each of its two ends with a pair of notches which define a pair of lugs 53 bent into a C-shape. The ends of the bent lugs from lips which ride along the upper sides of the edges of the band and hold the band down against the plate 49. The plate 49 is trapped between a pair of lugs 55 with a distance between them equal to the length of the plate 49, serving to render the plate 52 fast with the slide 22 during the movements of the latter over the scale 10.

The plate 52, moreover, comprises two leaf springs formed by two bent lugs 54 on the plate 52 itself, which bear against the underside of the plate 49 and, via the lugs 53, urge the band 12 to make close contact with the plate 49, therefore keeping the band 12 at a strictly constant distance from the plate 31. Finally, the plate 52 is provided with two longitudinal bent flanges 56, which are also resilient and eliminate transverse oscillations of the plate 52 with respect to the plate 49.

It is, therefore, obvious that the plate 52 retains the band 12 against the plate 49 by virtue of the pressure created by the bent lugs 54, enabling the band to have the necessary longitudinal sliding movement relative to the slide under a constant load. The increase in tension produced in the band 12 because of the pressure of the lugs 54 amounts to a few tens of grams and entails measuring errors which are negligible with respect to the required precision.

It is to be noted that the plate 52 can also arrange itself on the plate 49 at a small angle without affecting the freedom of sliding of the slide 22, so that the mounting of the plate 52 can be effected without specially looking for parallelism or other precision checks. In fact, by means of the lugs 53 and 54, the plate 52 adapts itself automatically to the plate 49 in its movement with respect to the band 12. This automatic adaptation is also effected because of the inevitable imperfections in the guiding of the slide 22 with respect to the scale 10 in the plane of the band 12, so that the band 12 is not compelled to bend because of these imperfections. Moreover, since the course taken by the band 12, even if perfectly tensioned, has a pseudocatenary form, because of the transverse adaptation of the plate 52, the band 12 does not have to bend sharply on the passage of the slide 22.

In order to mount the band 12 on the blocks 13 and 14, it is necessary to tension the band suitably. To this end, each of the two blocks 13 and 14 is provided with a threaded hole 57 (FIG. 2) normally closed by a plug 58. By removing the plug 58 from the hole 57 of the respective block 13 or 14, a band-tensioning device indicated generally by the reference 59 in FIG. 5 can be applied. The device 59 comprises a hollow support 61 provided with a scale 60 for indicating the tension of the band 12 in kg. A metal tube 62 having a slot 63 at one end in which there engages a pin 64 fixed internally to the support 61 can slide in this support. The tube 62 has a threaded portion 66 at the end opposite to the slot 63. Over the portion 66 is engaged a threaded knob 67 inside which there is disposed a rolling thrust bearing 68. A spiral compression spring 69 is arranged between the support 61 and the bearing 68.

A rod 71 having a threaded end 72 and co-operating with a second internally threaded knob 73 can slide in the tube 62. The other end of the rod 71 terminates in a block 74 having a pin 76 which can be engaged by a hole 77 (FIG. 1) provided at each end of the band 12.

In order to mount the band 12, the cover 41 is removed and one end of the band, for example, the left-hand end in FIG. 1, is first fixed by fully tightening the plate 16 by means of the screws 18. Then, the plate 17 is applied over the other end of the band 12, the corresponding screws 18 being screwed in so as to retain the band 12, but not so tightly as to prevent the band shifting.

The knob 67 of the device 59 (FIG. 5) is now screwed on so as to preload the spring 69 with a force slightly slower than the tension desired for the band 12. This force is indicated by the edge of the knob 67 on the scale 60 of the support 61. The plug 58 (FIG. 1) is then removed from the hole 57 of the block 14 and the device 59 (FIG. 5) pre-loaded in this way is applied to the hole, the support 61 being rested against the surface of the block 14. The support 61 is now rotated so as to orient the pin 76 to engage the hole 77 of the band 12 and the knob 73 is screwed on until it abuts the knob 67.

By continuing to screw the knob 73 on, the tube 62 is now moved together with the knob 67, so that the slot 63 is disengaged from the pin 64 and the force of the spring 69 is balanced by the tension of the band 12. The screwing-on of the knob 73 is now continued until the edge of the knob 67 arrives exactly at the indication of the scale 60 corresponding to the tension desired for the band 12.

The second end of the band 12 is then fixed by fully tightening the plate 17 by means of the screws 18. The device 59 can now be removed from the hole 57 after unscrewing the knob 67 to bring the pin 64 back into contact with the slot 63 and after slightly slackening the rod 71 by screwing on the knob 73. The plug 58 is then replaced in the hole 57 and the cover 41 is fixed over the scale 10.

What is claimed is:

1. A transducer for measuring linear positions, comprising a scale constituted by a tensioned flexible band bearing a first electric winding, a slide movable with respect to the scale and bearing a second winding, a guide plate fast with the slide, parallel to the second winding and extending over the whole area of the second winding, and pressure means arranged to keep the band in close contact with the plate.

2. A transducer according to claim 1, wherein the pressure means comprise guide elements disposed at the ends of the plate, and at least one leaf spring element urging the guide elements against the side of the band opposite to the plate.

3. A transducer according to claim 1, wherein the pressure means comprise a plate of resilient material, said plate of resilient material including a pair of lugs at each end of the guide plate so bent as to have lips bearing against the two edges of the band on the side opposite to the guide plate, and at least one leaf spring bent from said plate of resilient material.

4. A transducer according to claim 3, wherein a pair of elements of said plate of resilient material link it, through the medium of the guide plate, to the slide so as to force the plate of resilient material to move with the slide, while allowing a certain rotation in the plane of the guide plate.

5. A transducer according to claim 1, comprising a removable spring tensioning device for fitting removably to one end of the band and adjustable to establish a predetermined tension in the band, and means for clamping the one end of the tensioned band to allow the tensioning device to be removed, leaving the band with said predetermined tension.

* * * * *

UNITED STATES PATENT AND TRADEMARK OFFICE
CERTIFICATE OF CORRECTION

PATENT NO. : 4,117,439
DATED : September 26, 1978
INVENTOR(S) : NINO AZZANI

It is certified that error appears in the above-identified patent and that said Letters Patent are hereby corrected as shown below:

On the front page of the patent, change Assignee "Ing. C. Olivetti & C., S.p.A." to — Olivetti Controllo Numerico S.p.A. —

Signed and Sealed this

Twenty-fourth Day of July 1979

[SEAL]

Attest:

LUTRELLE F. PARKER
Attesting Officer
Acting Commissioner of Patents and Trademarks